US012165658B2

(12) United States Patent
Leppänen et al.

(10) Patent No.: US 12,165,658 B2
(45) Date of Patent: Dec. 10, 2024

(54) SPATIAL AUDIO PARAMETER ENCODING AND ASSOCIATED DECODING

(71) Applicant: Nokia Technologies Oy, Espoo (FI)

(72) Inventors: Jussi Leppänen, Tampere (FI); Tapani Pihlajakuja, Kellokoski (FI); Kari Jarvinen, Tampere (FI); Adriana Vasilache, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 281 days.

(21) Appl. No.: 17/642,500

(22) PCT Filed: Sep. 9, 2020

(86) PCT No.: PCT/FI2020/050577
§ 371 (c)(1),
(2) Date: Mar. 11, 2022

(87) PCT Pub. No.: WO2021/053266
PCT Pub. Date: Mar. 25, 2021

(65) Prior Publication Data

US 2022/0366918 A1 Nov. 17, 2022

(30) Foreign Application Priority Data

Sep. 17, 2019 (FI) ..................................... 20195777

(51) Int. Cl.
*G10L 19/008* (2013.01)
*G10L 19/02* (2013.01)
(Continued)

(52) U.S. Cl.
CPC ........ *G10L 19/008* (2013.01); *G10L 19/0204* (2013.01); *G10L 19/032* (2013.01);
(Continued)

(58) Field of Classification Search
CPC . G10L 19/008; G10L 19/0204; G10L 19/032; H04S 3/008; H04S 2400/01;
(Continued)

(56) References Cited

U.S. PATENT DOCUMENTS 8,874,800 B2 * 10/2014 Kitayama ............ G10H 1/0058 710/72
10,134,425 B1 * 11/2018 Johnson, Jr. ............ G10L 25/87
(Continued)

FOREIGN PATENT DOCUMENTS

EP 2830047 A1 1/2015
GB 2568274 A 5/2019
(Continued)

OTHER PUBLICATIONS

Office action received for corresponding Finnish Patent Application No. 20195777, dated Apr. 21, 2020, 6 pages.
(Continued)

*Primary Examiner* — Oyesola C Ojo
(74) *Attorney, Agent, or Firm* — ALSTON & BIRD LLP

(57) ABSTRACT

A method comprising: obtaining a first audio direction parameter value for each sub-band of a sub-frame of a frame of an audio signal; obtaining a second audio direction parameter value for the sub-frame of the frame of the audio signal for one or more audio objects associated with said audio signal; and determining a bit-efficient encoding for each first audio direction parameter value of the sub-frame based on a similarity between the first audio direction parameter value for each sub-band and the second audio direction parameter values for the one or more audio objects.

20 Claims, 8 Drawing Sheets

(51) Int. Cl.
*G10L 19/032* (2013.01)
*H04S 3/00* (2006.01)

(52) U.S. Cl.
CPC .......... *H04S 3/008* (2013.01); *H04S 2400/01* (2013.01); *H04S 2420/03* (2013.01); *H04S 2420/07* (2013.01)

(58) Field of Classification Search
CPC .. H04S 2420/03; H04S 2420/07; H04S 3/004; H04S 2400/11; H04S 2420/11
See application file for complete search history.

(56) References Cited

U.S. PATENT DOCUMENTS

2011/0002393 A1* 1/2011 Suzuki .................. G10L 19/008 375/240.18
2013/0073283 A1* 3/2013 Yamabe .............. G10L 21/0216 704/226
2013/0128701 A1* 5/2013 Derkx ...................... G01S 3/803 367/129
2014/0214432 A1* 7/2014 Hatanaka .............. G10L 19/008 704/500
2015/0095026 A1* 4/2015 Bisani .................... H04R 3/005 704/232
2015/0163587 A1* 6/2015 Li .......................... H04R 1/326 348/159
2015/0194158 A1* 7/2015 Oh ........................ G10L 19/008 381/22
2016/0005394 A1* 1/2016 Hiroe .................. G10L 21/0272 704/248
2016/0064006 A1* 3/2016 Disch .................... G10L 19/008 704/500
2016/0133263 A1* 5/2016 Borss ...................... H04S 3/008 381/23
2017/0013371 A1* 1/2017 Pedersen .............. H04R 25/407
2017/0125023 A1* 5/2017 Oh ............................ H04S 7/30
2018/0096692 A1* 4/2018 Purnhagen ............ G10L 19/008
2022/0007126 A1* 1/2022 Bruhn ........................ H04S 3/02
2022/0108705 A1* 4/2022 Fuchs ................... G10L 19/005

FOREIGN PATENT DOCUMENTS

WO 2019/091575 A1 5/2019
WO 2019/105575 A1 6/2019

OTHER PUBLICATIONS

International Search Report and Written Opinion received for corresponding Patent Cooperation Treaty Application No. PCT/FI2020/050577, dated Mar. 19, 2021, 23 pages.
Office action received for corresponding Indian Patent Application No. 202247020717, dated Aug. 30, 2022, 5 pages.
Office action received for corresponding Chinese Patent Application No. 202080064933.0, dated Apr. 3, 2024, 6 pages of office action and no page of translation available.
Office Action for Korean Application No. 10-2022-7012458 dated Aug. 9, 2024, 14 pages.

* cited by examiner

SPATIAL AUDIO PARAMETER ENCODING AND ASSOCIATED DECODING

RELATED APPLICATION

This application was originally filed as PCT Application No. PCT/FI2020/050577, filed on Sep. 9, 2020, which claims priority from Finland Application No. 20195777, filed on Sep. 17, 2019, each of which is incorporated herein by reference in its entirety.

TECHNICAL FIELD

The present invention relates to sound-field related parameter encoding, but not exclusively for time-frequency domain direction related parameter encoding for an audio encoder and decoder.

BACKGROUND

Parametric spatial audio processing is a field of audio signal processing where the spatial aspect of the sound is described using a set of parameters. For example, in parametric spatial audio capture from microphone arrays, it is a typical and an effective choice to estimate from the microphone array signals a set of parameters such as directions of the sound in frequency bands, and the ratios between the directional and non-directional parts of the captured sound in frequency bands. These parameters are known to well describe the perceptual spatial properties of the captured sound at the position of the microphone array. These parameters can be utilized in synthesis of the spatial sound accordingly, for headphones binaurally, for loudspeakers, or to other formats, such as Ambisonics.

The directions and direct-to-total energy ratios in frequency bands are thus a parameterization that is particularly effective for spatial audio capture.

A parameter set consisting of a direction parameter in frequency bands and an energy ratio parameter in frequency bands (indicating the directionality of the sound) can be also utilized as the spatial metadata (which may also include other parameters such as coherence, spread coherence, number of directions, distance etc) for an audio codec. For example, these parameters can be estimated from microphone-array captured audio signals, and for example a stereo signal can be generated from the microphone array signals to be conveyed with the spatial metadata. The stereo signal could be encoded, for example, with an AAC encoder. A decoder can decode the audio signals into PCM signals and process the sound in frequency bands (using the spatial metadata) to obtain the spatial output, for example a binaural output.

The aforementioned solution is particularly suitable for encoding captured spatial sound from microphone arrays (e.g., in mobile phones, VR cameras, stand-alone microphone arrays). However, it may be desirable for such an encoder to have also other input types than microphone-array captured signals, for example, loudspeaker signals, audio object signals, or Ambisonic signals.

Analysing first-order Ambisonics (FOA) inputs for spatial metadata extraction has been thoroughly documented in scientific literature related to Directional Audio Coding (DirAC) and Harmonic planewave expansion (Harpex). This is since there exist microphone arrays directly providing a FOA signal (more accurately: its variant, the B-format signal), and analysing such an input has thus been a point of study in the field.

A further input for the encoder is also multi-channel loudspeaker input, such as 5.1 or 7.1 channel surround inputs.

The above processes may involve obtaining the directional parameters, such as azimuth and elevation, and energy ratio as spatial metadata through the multi-channel analysis in time-frequency domain. On the other hand, the directional metadata for individual audio objects may be processed in a separate processing chain. However, possible synergies in the processing of these two types of metadata is not efficiently utilised, if the metadata are processed separately.

SUMMARY

Now, an improved method and technical equipment implementing the method has been invented, by which the above problems are alleviated. Various aspects include a method, an apparatus and a non-transitory computer readable medium comprising a computer program or a signal stored therein, which are characterized by what is stated in the independent claims. Various details of the embodiments are disclosed in the dependent claims and in the corresponding images and description.

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is provided an apparatus comprising means for: obtaining a first audio direction parameter value for each sub-band of a sub-frame of a frame of an audio signal; obtaining a second audio direction parameter value for the sub-frame of the frame of the audio signal for one or more audio objects associated with said audio signal; and determining a bit-efficient encoding for each first audio direction parameter value of the sub-frame based on a similarity between the first audio direction parameter value for each sub-band and the second audio direction parameter value for the one or more audio objects.

According to an embodiment, said first and second audio direction parameters are defined as a point on a surface of a sphere.

According to an embodiment, the first audio direction parameter value comprises at least one azimuth value and at least one elevation value for each sub-band of the sub-frame and the second audio direction parameter values comprises at least one azimuth value and at least one elevation value for each audio object.

According to an embodiment, the one or more audio objects is associated with either the subframe of the frame of the audio signal or the frame of the audio signal.

According to an embodiment, said bit-efficient encoding for the first audio direction parameter values comprises: encoding an index of an audio object as the first audio direction parameter values in response to the similarity of said second audio direction parameter values of said audio object and said first audio direction parameter values is below a predetermined threshold; or encoding the first audio direction parameter values as quantized first audio direction parameter values in response to the similarity of said second audio direction parameter values of said audio object and said first audio direction parameter values is above said predetermined threshold.

According to an embodiment, said means for determining a bit-efficient encoding for the first audio direction parameter values further comprise means for: determining a directional difference between original first audio direction parameter values and the quantized first audio direction parameter values for each sub-band and sub-frame; determining a directional difference between the original first audio direction parameter values and the second audio direction parameter values of said audio object for each sub-band and sub-frame; determining the smallest value for the directional difference between the original first audio direction parameter values and the second audio direction parameter values of said audio object; and using the smallest value in comparison of similarities between the first audio direction parameter values and the second audio direction parameter values.

According to an embodiment, the apparatus further comprises means for: encoding an indication in or along a bitstream for indicating whether an index of an audio object is allowed to be encoded as the first audio direction parameter values.

According to an embodiment, said indication is audio frame specific.

According to an embodiment, said first audio direction parameter values further comprise a signal energy value for each sub-band and sub-frame and said second audio direction parameter values further comprise a signal energy value of each audio object for each sub-frame; and the apparatus further comprises means for: determining a masking parameter, based on the signal energy value for a sub-frame and a sub-band and the signal energy value for an audio object for said sub-frame, said masking parameter defining whether the direction of the audio object sufficiently corresponds to the direction of said sub-frame and said sub-band of the frame.

According to an embodiment, the apparatus further comprises means for skipping encoding of the first audio direction parameter values as quantized first audio direction parameter values in response to the masking parameter indicating that the direction of the audio object sufficiently corresponds to the direction of said sub-frame and said sub-band of the frame.

According to an embodiment, the apparatus further comprises means for adjusting the masking parameter by a weighting function, said weighting function adjusting an angle required for sufficient correspondence of the direction of the audio object and the direction of said sub-frame and said sub-band of the frame.

According to an embodiment, the apparatus further comprises means for encoding an indication in or along a bitstream for indicating whether encoding of the first parameter values as quantized first parameter values is allowed to be skipped.

According to an embodiment, said indication is audio frame specific.

According to an embodiment, said means for determining the bit-efficient encoding for the first audio direction parameter values comprises means for using the second audio direction parameter values of at least one audio object as a reference when encoding the first audio direction parameter values as quantized first audio direction parameter values.

According to an embodiment, the apparatus further comprises means for: estimating the number of bits required for encoding the first audio direction parameter values as quantized first audio direction parameter values; calculating, for each object, an angle difference between the first audio direction parameter values for all time-frequency tiles and a quantized direction of the object; estimating the number of bits required for encoding said angle difference; indexing, in response to the number of bits required for encoding said angle difference is smaller than the number of bits required for encoding the first audio direction parameter values as quantized first audio direction parameter values, said object as a reference object; and selecting, among objects indexed as the reference objects, the object having the lowest number of bits required for encoding said angle difference as the reference object to be used.

According to an embodiment, the apparatus further comprises means for: signaling, if a reference object is used for encoding; and if affirmative, including an indication about the index of reference object in or along the bitstream to be encoded.

According to an embodiment, the apparatus further comprising means for: signaling the usage of the reference object and the index of reference object as time-frequency tile specifically.

A method according to a second aspect comprises obtaining a first audio direction parameter value for each sub-band of a sub-frame of a frame of an audio signal; obtaining second audio direction parameter value for the sub-frame of the frame of the audio signal for one or more audio objects associated with said audio signal; and determining a bit-efficient encoding for each first audio direction parameter value of the sub-frame based on a similarity between the first audio direction parameter value for each sub-band and the second audio direction parameter value for the one or more audio objects.

An apparatus according to a third aspect comprises at least one processor and at least one memory, said at least one memory stored with computer program code thereon, the at least one memory and the computer program code configured to, with the at least one processor, cause the apparatus at least to perform: obtain a first parameter values for each sub-band of a sub-frame of a frame of an audio signal; obtain a second parameter value for the sub-frame of the frame of the audio signal for one or more audio objects associated with said audio signal; and determine a bit-efficient encoding for each first audio direction parameter value of the sub-frame based on a similarity between the first audio direction parameter value for each sub-band and the second audio direction parameter value for the one or more audio objects.

Computer readable storage media according to further aspects comprise code for use by an apparatus, which when executed by a processor, causes the apparatus to perform the above methods.

BRIEF DESCRIPTION OF THE DRAWINGS

For a more complete understanding of the example embodiments, reference is now made to the following descriptions taken in connection with the accompanying drawings in which.

DETAILED DESCRIPTION OF SOME EXAMPLE EMBODIMENTS

Figure 1:
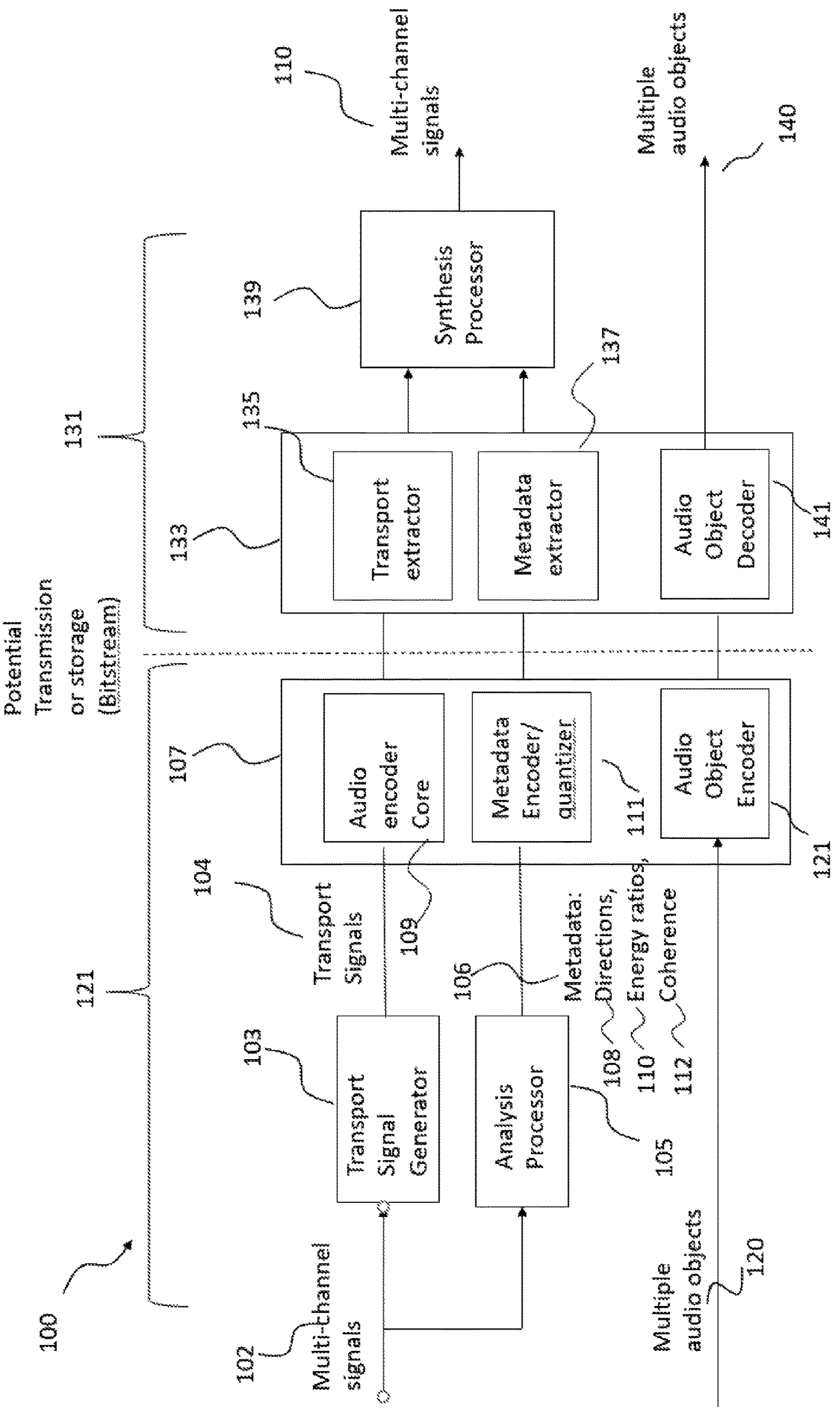
FIG. 1 shows schematically a system of apparatus suitable for implementing some embodiments.

The following describes in further detail suitable apparatus and possible mechanisms for the provision of effective spatial analysis derived metadata parameters. In the following discussions multi-channel system is discussed with respect to a multi-channel microphone implementation. However as discussed above the input format may be any suitable input format, such as multi-channel loudspeaker, ambisonic (FOA/HOA) etc. It is understood that in some embodiments the channel location is based on a location of the microphone or is a virtual location or direction. Furthermore, the output of the example system is a multi-channel loudspeaker arrangement. However, it is understood that the output may be rendered to the user via means other than loudspeakers. Furthermore, the multi-channel loudspeaker signals may be generalised to be two or more playback audio signals.

As discussed previously, spatial metadata parameters such as direction and direct-to-total energy ratio (or diffuseness-ratio, absolute energies, or any suitable expression indicating the directionality/non-directionality of the sound at the given time-frequency interval) parameters in frequency bands are particularly suitable for expressing the perceptual properties of natural sound fields. Synthetic sound scenes such as 5.1 loudspeaker mixes commonly utilize audio effects and amplitude panning methods that provide spatial sound that differs from sounds occurring in natural sound fields. In particular, a 5.1 or 7.1 mix may be configured such that it contains coherent sounds played back from multiple directions. For example, it is common that some sounds of a 5.1 mix perceived directly at the front are not produced by a centre (channel) loudspeaker, but for example coherently from left and right front (channels) loudspeakers, and potentially also from the centre (channel) loudspeaker. The spatial metadata parameters such as direction(s) and energy ratio(s) do not express such spatially coherent features accurately. As such other metadata parameters, such as coherence parameters, may be determined from analysis of the audio signals to express the audio signal relationships between the channels.

In addition to multi-channel input format audio signals an encoding system may also be required to encode audio objects representing various sound sources within a physical space. Each audio object can be accompanied, whether it is in the form of metadata or some other mechanism, by directional data in the form of azimuth and elevation values which indicate the position of an audio object within a physical space.

As expressed above an example of the incorporation of direction information for audio objects as metadata is to use determined azimuth and elevation values.

A direction parameter may be determined for audio objects and to index the parameter based on a practical sphere covering based distribution of the directions in order to define a more uniform distribution of directions.

The proposed directional index for audio objects may then be used alongside a downmix signal (channels), to define a parametric immersive format that can be utilized, e.g., for the Immersive Voice and Audio Service (IVAS) codec. Alternatively and in addition, the spherical grid format can be used in the codec to quantize directions.

With respect to FIG. 1 an example apparatus and system for implementing embodiments of the application are shown. The system 100 is shown with an 'analysis' part 121 and a 'synthesis' part 131. The 'analysis' part 121 is the part from receiving the multi-channel loudspeaker signals up to an encoding of the metadata and downmix signal and the 'synthesis' part 131 is the part from a decoding of the encoded metadata and downmix signal to the presentation of the re-generated signal (for example in multi-channel loudspeaker form).

The input to the system 100 and the 'analysis' part 121 is the multi-channel signals 102. In the following examples a microphone channel signal input is described, however any suitable input (or synthetic multi-channel) format may be implemented in other embodiments. For example, in some embodiments the spatial analyser and the spatial analysis may be implemented external to the encoder. For example, in some embodiments the spatial metadata associated with the audio signals may be a provided to an encoder as a separate bit-stream. In some embodiments the spatial metadata may be provided as a set of spatial (direction) index values.

The multi-channel signals are passed to a downmixer 103 (a.k.a. "Transport signal generator) and to an analysis processor 105.

In some embodiments the downmixer 103 is configured to receive the multi-channel signals and downmix the signals to a determined number of channels and output the downmix signals 104 (a.k.a. "Transport signals"). For example, the downmixer 103 may be configured to generate a 2-audio-channel downmix of the multi-channel signals. The determined number of channels may be any suitable number of channels. In some embodiments the downmixer 103 is optional and the multi-channel signals are passed unprocessed to an encoder 107 in the same manner as the downmix signal are in this example.

In some embodiments the analysis processor 105 is also configured to receive the multi-channel signals and analyse the signals to produce metadata 106 associated with the multi-channel signals and thus associated with the downmix signals 104. The analysis processor 105 may be configured to generate the metadata which may comprise, for each time-frequency analysis interval, a direction parameter 108 and an energy ratio parameter 110 (and in some embodiments a coherence parameter 112, and a diffuseness parameter). The direction and energy ratio may in some embodiments be considered to be spatial audio parameters. In other words, the spatial audio parameters comprise parameters which aim to characterize the sound-field created by the multi-channel signals (or two or more playback audio signals in general).

In some embodiments the parameters generated may differ from frequency band to frequency band. Thus, for example in band X all of the parameters are generated and transmitted, whereas in band Y only one of the parameters is generated and transmitted, and furthermore in band Z no parameters are generated or transmitted. A practical example of this may be that for some frequency bands such as the highest band some of the parameters are not required for perceptual reasons. The downmix signals 104 and the metadata 106 may be passed to an encoder 107.

The encoder 107 may comprise an audio encoder core 109 which is configured to receive the downmix (or otherwise) signals 104 and generate a suitable encoding of these audio signals. The encoder 107 can in some embodiments be a computer (running suitable software stored on memory and on at least one processor), or alternatively a specific device utilizing, for example, FPGAs or ASICs. The encoding may be implemented using any suitable scheme.

The encoder 107 may furthermore comprise a metadata encoder/quantizer 111 which is configured to receive the metadata and output an encoded or compressed form of the information. The metadata encoder/quantizer 111 may comprise an energy ratio analyser (or quantization resolution determiner). The energy ratio analyser may be configured to receive the energy ratios and from the analysis generate a quantization resolution for the direction parameters (in other words a quantization resolution for elevation and azimuth values) for all of the time-frequency tiles in the frame. This bit allocation may for example be defined by bits_dir0[0:N−1][0:M−1].

The metadata encoder/quantizer 111 may comprise a direction index generator configured to receive the direction parameters 108, such as the azimuth $\phi$ (k,n) and elevation $\theta$(k,n) and the quantization bit allocation, and from this, generate a quantized output. The quantization may be based on an arrangement of spheres forming a spherical grid arranged in rings on a 'surface' sphere, which are defined by a look-up table defined by the determined quantization resolution. In other words, the spherical grid uses the idea of covering a sphere with smaller spheres and considering the centres of the smaller spheres as points defining a grid of almost equidistant directions. The smaller spheres therefore define cones or solid angles about the centre point which can be indexed according to any suitable indexing algorithm. Although spherical quantization is described here any suitable quantization, linear or non-linear may be used.

For example, the look-up table may allocate 1-11 bits for direction parameters (azimuth and elevation) based on e.g. the energy ratio index. Depending on the number of allocated bits, a certain number of elevation values in the 'North hemisphere' of the sphere of directions, including the Equator, are defined, as well as a number of azimuth values at each elevation for each quantizer.

For instance, for 5 bits there may be 4 elevation values corresponding to [0, 30, 60, 90] and 4−1=3 negative elevation values [−30, −60, −90]. For the first elevation value, 0, there may be 12 equidistant azimuth values, for the elevation values 30 and −30 there may be 7 equidistant azimuth values etc.

In some embodiments the encoder 107 may further interleave, multiplex to a single data stream or embed the metadata within encoded downmix signals before transmission or storage shown in FIG. 1 by the dashed line. The multiplexing may be implemented using any suitable scheme.

In the decoder side, the received or retrieved data (stream) may be received by a decoder/demultiplexer 133. The decoder/demultiplexer 133 may demultiplex the encoded streams and pass the audio encoded stream to a downmix extractor 135 which is configured to decode the audio signals to obtain the downmix signals. Similarly, the decoder/demultiplexer 133 may comprise a metadata extractor 137 which is configured to receive the encoded metadata and generate metadata. The decoder/demultiplexer 133 can in some embodiments be a computer (running suitable software stored on memory and on at least one processor), or alternatively a specific device utilizing, for example, FPGAs or ASICs.

The decoded metadata and downmix audio signals may be passed to a synthesis processor 139. The system 100 'synthesis' part 131 further shows a synthesis processor 139 configured to receive the downmix and the metadata and re-creates in any suitable format a synthesized spatial audio in the form of multi-channel signals 110 (these may be multichannel loudspeaker format or in some embodiments any suitable output format such as binaural or Ambisonics signals, depending on the use case) based on the downmix signals and the metadata.

The additional input 120 may specifically comprise directional data associated with multiple audio objects. One particular example of such a use case is a teleconference scenario where participants are positioned around a table. Each audio object may represent audio data associated with each participant. In particular the audio object may have positional data associated with each participant.

Thus, the system 100 can be configured to accept multiple audio objects along the input 120, and that each audio object can have associated directional data. The audio objects including associated directional data may then be passed to an audio object encoder 121 for encoding and quantization. To that extent the directional data associated with each audio object can also be expressed in terms of azimuth $\varphi$ and elevation $\theta$, where the azimuth value and elevation value of each audio object indicates the position of the object in space at any point in time. The azimuth and elevation values can be updated on a time frame by time frame basis which does not necessarily have to coincide with the time frame resolution of the directional metadata parameters associated with the multi-channel audio signals.

In general, the directional information for N active input audio objects to the audio object encoder 121 may be expressed in the form of $P_q=(\theta_q, \varphi_q)$, q=0:N−1, where $P_q$ is the directional information of an audio object with index q having a two dimensional vector comprising elevation $\theta$ value and the azimuth $\varphi$ value.

Figure 2:
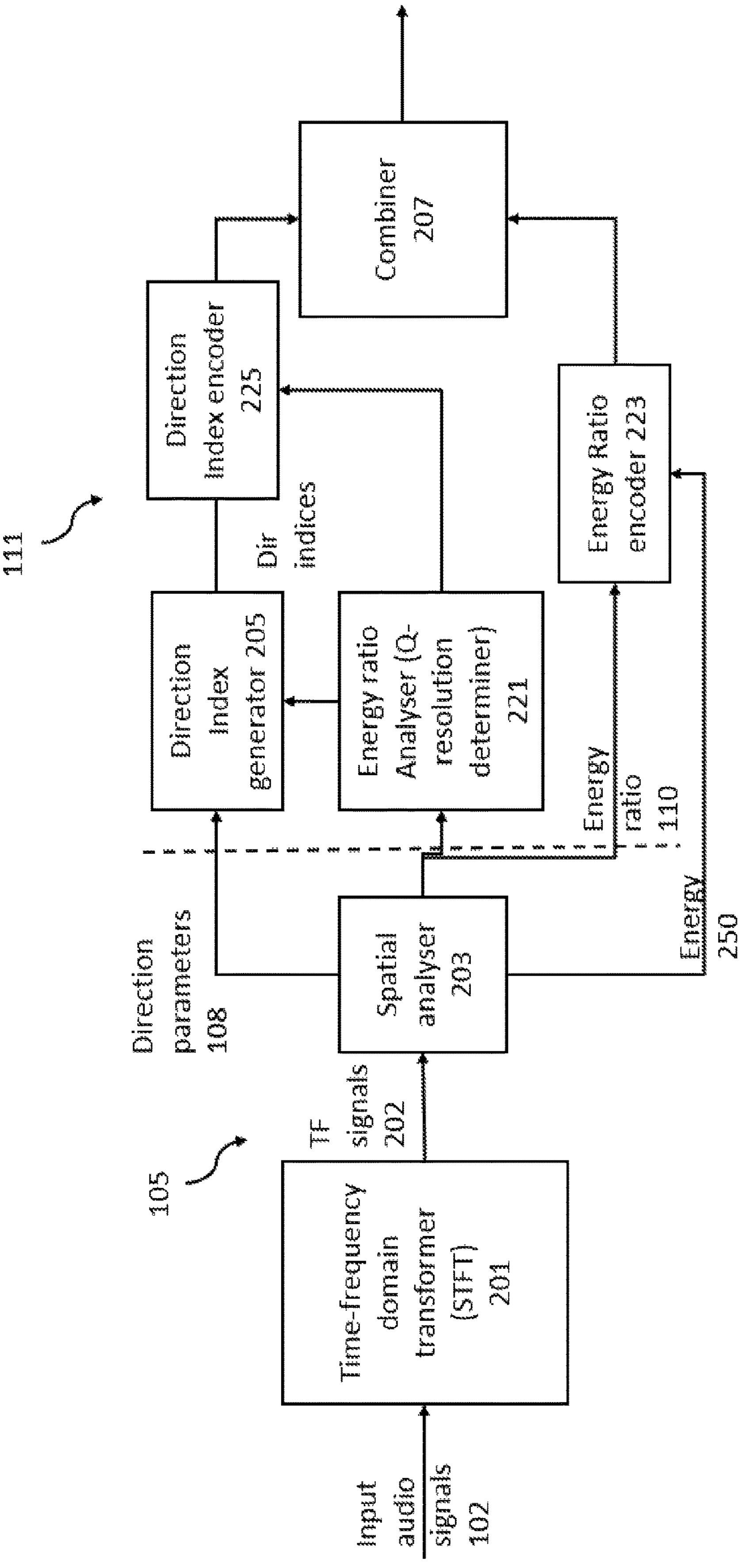
FIG. 2 shows schematically the metadata encoder according to some embodiments.

For explaining more in detail how to find vector difference between the directional information of an audio object and a "template" audio direction parameter derived for the audio object, and then to quantise the vector difference using a spherical quantization scheme, a reference is made to FIG. 2 for depicting some of the functionalities of the audio object encoder 121 in more detail.

The audio object encoder 121 can comprise an audio object direction deriver 201 arranged to derive a suitable "template" audio direction parameter for each audio object. In embodiments this may be derived as a N dimensional vector having as elements N derived audio direction parameters corresponding to the N audio objects. These derived audio direction parameters may be derived from the viewpoint of considering audio objects being distributed around the circumference of a circle. In particular, the derived audio direction parameters may be considered from the viewpoint of the audio objects directions being evenly distributed as N equidistant points around a unit circle.

In the following description, the N derived audio direction parameters are disclosed as being formed into a vector structure (termed the vector, SP) with each element corresponding to the derived audio direction parameter for one of the N audio objects. However, it is to be understood that the following disclosure can be applied by considering the derived audio direction parameters as a collection of indexed parameters which do not need to be structured in the form of a vector.

The audio object direction deriver 201 can be configured to derive a "template" derived audio direction vector SP having N two dimensional elements, whereby each element represents the azimuth and elevation associated with an audio object. The vector SP may then be initialised by setting the azimuth and elevation value of each element such that the N audio objects are evenly distributed around a unit circle. This can be realised by initializing each audio object direction element within the vector to have an elevation value of zero and an azimuth value of $$q \cdot \frac{360}{N},$$

where q is the index of the associated audio object. Therefore, the vector SP can be written for the N audio objects as $$SP = \left(0, 0; 0, \frac{360}{N}; 0, 2x\frac{360}{N}; \ \ldots \ ; 0, (N-1)x\frac{360}{N}\right)$$

In other words, the SP vector can be initialised so that the directional information of each audio objects (the derived audio direction parameters) are presumed to be distributed evenly along a unit circle starting at an azimuth value of 0°.

The derived audio direction SP vector having elements comprising the derived audio direction parameters corresponding to the audio objects may then be passed to the audio direction rotator 203 in the audio object encoder 121. The audio direction rotator 203 is also depicted as receiving the audio objects 120. In particular the audio direction rotator 203 may then use the audio direction parameter of the first audio object in subsequent processing by rotating each derived direction within the SP vector by the azimuth value of the first component $\phi_0$ from the first received audio object $P_0$. That is each azimuth component of each derived audio direction parameter within the derived vector SP may be rotated by adding the value of the first azimuth component $\phi_0$ of the first received audio object. In terms of the SP vector this operation results in each element having the following form $$\widehat{SP} = \left(0, 0 + \phi 0; 0, \frac{360}{N} + \phi 0; 0, 2x\frac{360}{N} + \phi 0; \ \ldots \ ; 0, (N-1)x\frac{360}{N} + \phi 0\right)$$

For embodiments which are deployed having an elevation angle of zero for the derived audio direction vector SP the vector SP can be expressed solely in terms of the azimuth angles $\widehat{SP} = (\phi_0; \phi_1; \phi_2; \ldots ; \phi_{N-1})$, where $\phi i$ is the rotated azimuth component given by $$i \cdot \frac{360}{N} + \phi_0$$

and SP is the rotated derived audio direction vector. As a result of this step the rotated derived audio direction vector $\widehat{SP}$ is now aligned to the direction of the first audio object on the unit circle.

The audio object encoder 121 may then be arranged to quantize and encode the above rotated derived audio direction vector $\widehat{SP}$. In embodiments this can simply comprise quantizing the rotation angle $\phi_0$ to a particular resolution by the quantizer 211. For example, a linear quantizer with a resolution of 2.5 degrees (that is 5 degrees between consecutive points on the linear scale) results in 72 linear quantization levels. It is to be noted that the (unrotated) derived audio direction vector SP is dependent on the number of active audio objects N and this factor can be either passed to the decoder or otherwise agreed with the encoder.

The audio object encoder 121 can also comprise an audio direction repositioner & indexer 205 configured to reorder the position of the received audio objects in order to align more closely to the rotated derived audio directions of the elements of the rotated derived audio direction vector $\widehat{SP}$. This may be achieved by reordering the position of the audio objects such that the azimuth value of each reordered audio object is aligned with the position of the element in the vector $\widehat{SP}$ having the closest azimuth value. The reordered positions of each audio object may then be encoded as a permutation index.

The K bits used to scalar quantise the azimuth of the first object $\phi_0$, which can be termed $I_{\varphi 0}$, and the Index, $I_{r0}$ representing the order of indices of the audio direction parameters of the audio objects 1 to N−1 can be form part of an encoded bitstream such as that from the encoder 100.

As mentioned above the rotated derived audio direction vector $\widehat{SP}$ can be a "template" from which an audio direction difference vector can be derived for the audio direction parameter of each audio object. This may be performed for instance by the difference determiner 207 in FIG. 2. In embodiments the audio direction difference vector can be a 2-dimensional vector having an elevation difference value and an azimuth difference value. For instance, the audio direction difference vector $(\Delta\theta_q, \Delta\phi_q)$ for an audio object $P_q$ with directional components $(\theta_q, \phi_q)$ can be found as $(\Delta\theta_q, \Delta\phi_q) = (\theta_q - \widehat{\theta q}, \phi_q, \widehat{\varphi q}$.

It is to be understood that the directional difference for an audio object $P_q$ is formed based on the difference between each element of the rotated derived audio direction vector $\widehat{SP}$ and the corresponding reordered (or repositioned) audio objects.

The directional difference vector $(\Delta\theta_q, \Delta\phi_q)$ associated with each audio object may then be quantized by a spherical quantizer & indexer 209.

The audio encoding scheme described above, and which may be considered applicable to 3GPP IVAS encoder as well, may be referred to as metadata-assisted spatial audio (MASA). Therein, the directional parameters, such as azimuth and elevation, and energy ratio obtained through the multi-channel analysis in time-frequency domain may be considered to represent the spatial metadata. On the other hand, the directional metadata for individual audio objects is processed in a separate processing chain, as shown in FIGS. 1 and 2.

It is obvious that the metadata describing the direction/position of individual audio objects, on one hand, and the metadata describing the spatial audio within the same audio scene, on the other hand, contain certain similarities and correlation. A certain number of bits is needed to represent compressed/quantized spatial metadata associated with spatial audio. Similarly, a certain number of bits is needed for the metadata related to any audio objects to be encoded along with the spatial audio. However, synergies in the quantization of metadata of the two are not utilized if the compression/quantization of these two types of metadata is done separately.

In the following, an enhanced method for encoding time-frequency tiles of an audio frame will be described in more detail, in accordance with various embodiments.

Figure 3:
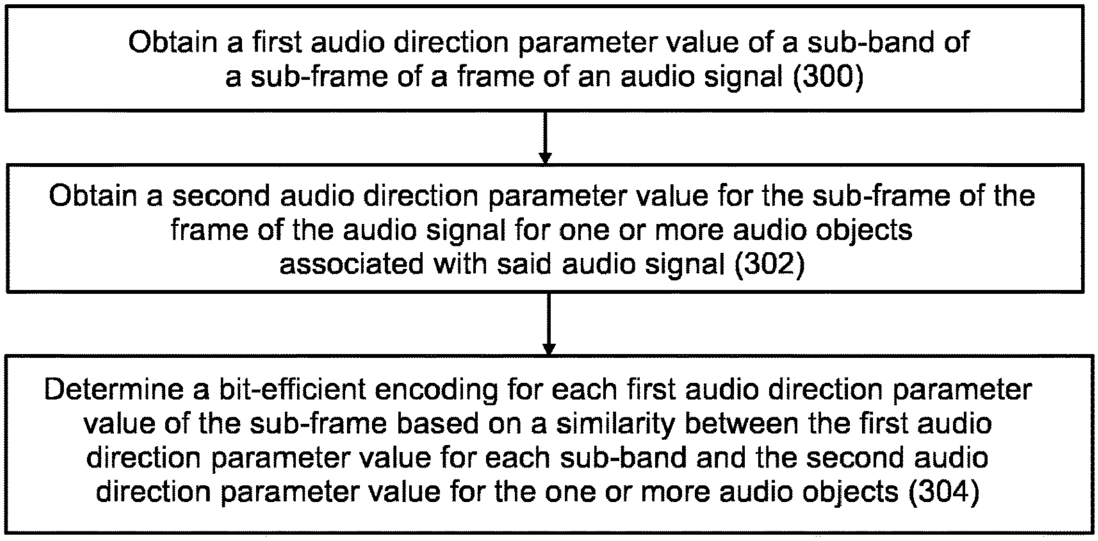
FIG. 3 show a flow chart for encoding time-frequency tiles of an audio frame according to an embodiment.

The method, which is disclosed in FIG. 3, comprises obtaining (300) a first audio direction parameter value for each sub-band of a sub-frame of a frame of an audio signal; obtaining (302) a second audio direction parameter value for the sub-frame of the frame of the audio signal for one or more audio objects associated with said audio signal; and determining (304) a bit-efficient encoding for each first audio direction parameter value of the sub-frame based on a similarity between the first audio direction parameter value for each sub-band and the second audio direction parameter value for the one or more audio objects.

Thus, the method provides for the encoding of direction information for MASA time-frequency tiles, where also audio object direction metadata is obtained, and a frame-wise comparison of at least the direction metadata of the MASA and the direction metadata of the audio object signals is carried out. As a result of the comparison, most bit-efficient way of encoding the direction metadata is determined for a frame or a part of a frame, such as a subframe or a time-frequency tile.

According to an embodiment, said first and second audio direction parameters are defined as a point on a surface of a sphere. Thus, the audio direction parameters may be defined e.g. as a direction vector having its value defined in three dimensions, or an index value defining a direction to a spherical surface location from the center of the sphere.

According to an embodiment, the first audio direction parameter value comprises at least one azimuth value and at least one elevation value for each sub-band and sub-frame and the second audio direction parameter values comprising at least one azimuth value and at least one elevation value for each audio object for each sub-frame.

Thus, as explained above, in MASA audio coding scheme the directional parameters are typically defined as azimuth and elevation values, and this applies also for the audio object directional parameters. It is noted that for the first audio direction parameter values, such as the parametric spatial audio related direction-of-arrival parameter used in MASA, the azimuth and elevation values may be defined in both temporal and frequency domains, whereas for the second audio direction parameter values, such as the audio object directional parameters, it suffices to define them in temporal domain only, such as being associated with a frame or a subframe of a frame of the audio signal.

In the following, the "first audio direction parameter values" and "second audio direction parameter values" are simply referred to as "first parameter values" and "second parameter values".

According to an embodiment, said bit-efficient encoding for the first parameter values comprises: encoding an index of an audio object as the first parameter values in response to the similarity of said second parameter values of said audio object and said first parameter values is below a predetermined threshold; or encoding the first parameter values as quantized first parameter values in response to the similarity of said second parameter values of said audio object and said first parameter values is above said predetermined threshold.

Consequently, depending on the direction metadata, the time-frequency tile direction may be encoded either as a pointer/index to an audio object, thus using the direction of the audio object as such, or separately as quantized time-frequency tile direction parameters.

According to an embodiment, a possible masking of a time-frequency tile by an audio object is determined based on audio signal energies of the time-frequency tile and the audio object for candidate time-frequency tile/audio object pairs.

According to an embodiment, the time-frequency tile direction may be omitted from encoding altogether when the audio object masks the time-frequency tile. In yet another embodiment, the encoding of the audio object metadata may be skipped if it is masked by the MASA audio.

According to an embodiment, which may be used together with or independently of other embodiments, said bit-efficient encoding for the first parameter values comprises using the second parameter values of at least one audio object as a reference when encoding the first parameter values as quantized first parameter values.

These embodiments are described more in detail in the following examples.

Figure 4:
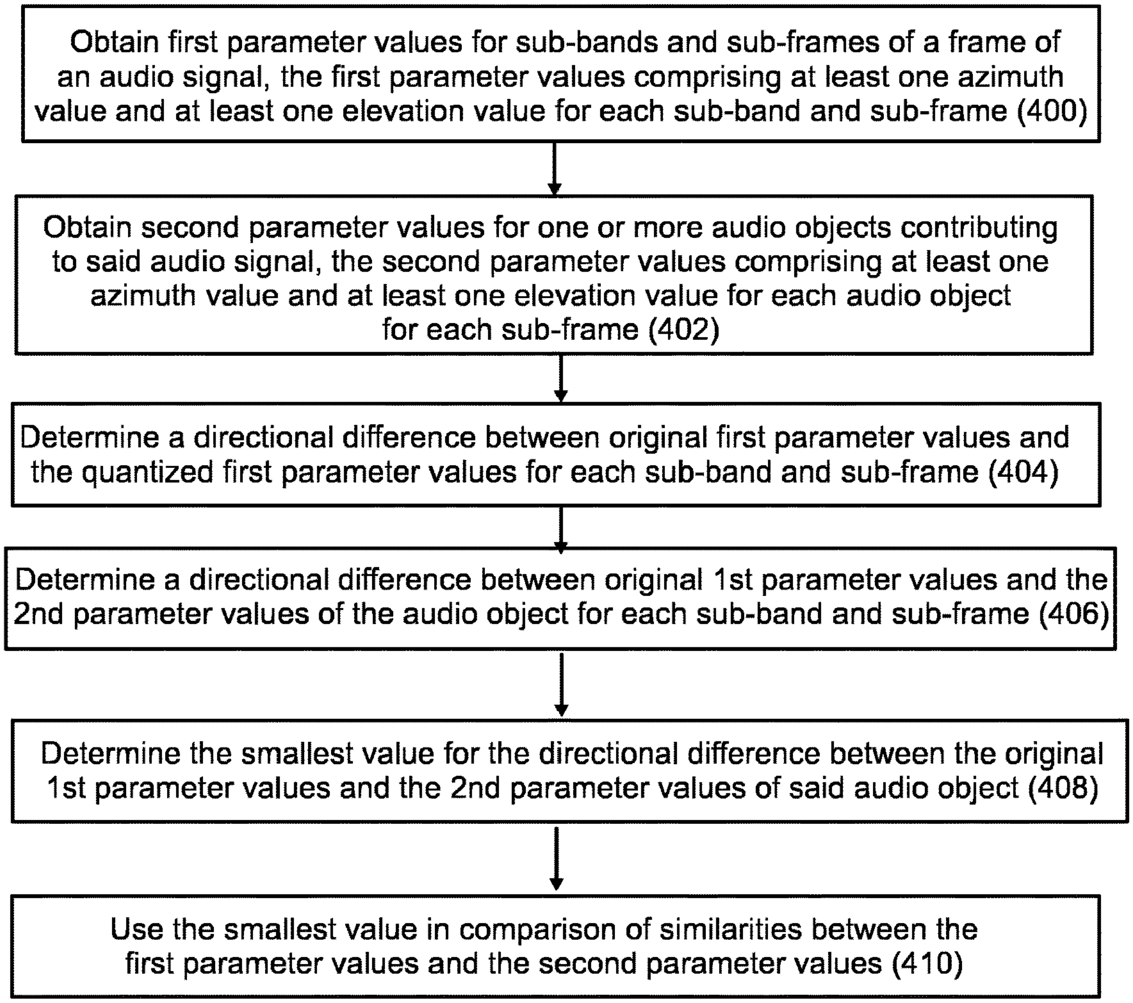
FIG. 4 show a flow chart for encoding time-frequency tiles of an audio frame according to another embodiment.

FIG. 4 shows a flowchart according to an embodiment, where the most bit-efficient way of encoding the time-frequency tile direction metadata is selected between an index of an audio object or encoding a directional difference between the original direction parameters and the quantized direction parameters of the time-frequency tile. Therein, the first two steps are similar to those of FIG. 3: first, the direction metadata (i.e. azimuth, elevation) for the time-frequency tile is obtained (400), and secondly, the direction metadata is obtained for all audio objects (402).

The embodiment further comprises determining a directional difference between original first parameter values and the quantized first parameter values for each sub-band and sub-frame (404); determining a directional difference between the original first parameter values and the second parameter values of said audio object for each sub-band and sub-frame (406); determining the smallest value for the directional difference between the original first parameter values and the second parameter values of said audio object (408); and using the smallest value in comparison of similarities between the first parameter values and the second parameter values (410).

The directional difference between the original direction parameters and the quantized direction parameters of the time-frequency tile may be determined as follows:

The direction difference (so-called great circle distance) $d_{oa}$ between the original direction (azimuth, elevation) of the time-frequency tile ($\theta_o$, $\varphi_o$) and its direction after carrying out the above-described directional data quantization ($\theta_q$, $\varphi_q$) is calculated according to Eq. 1:

$$d_{ab} = 2r\sin^{-1}\left(\sqrt{\sin^2\left(\frac{\varphi_b - \varphi_a}{2}\right) + \cos(\varphi_a)\cos(\varphi_b)\sin^2\left(\frac{\theta_b - \theta_a}{2}\right)}\right) \quad (1)$$

In the following, the MASA directional data encoding as described in accordance with FIGS. 1 and 2 is referred as "normal encoding". The direction difference of the time-frequency tile to all audio objects is calculated as well ($d_{oai}$, i=0 . . . N audio objects). The direction differences are then compared in order to find the smallest of direction difference of the time-frequency tile to one of the audio objects.

According to an embodiment, if the smallest direction difference is smaller than a predetermined threshold T, then the time-frequency tile direction is encoded as the audio object index, otherwise "normal encoding" is used. In other words, if the time-frequency tile direction is sufficiently close to the direction of an audio object, then they may be considered to coincide, and the time-frequency tile direction may be encoded simply as the audio object index.

According to an embodiment, if the smallest direction difference corresponds to an audio object, the time-frequency tile direction is encoded as the audio object index, otherwise "normal encoding" is used. Thus, compared to the previous embodiment, the value of the predetermined threshold T=0, wherein a stricter rule requires that the time-frequency tile direction shall exactly coincide with the direction of an audio object in order to encode the time-frequency tile direction simply as the audio object index.

Figure 5:
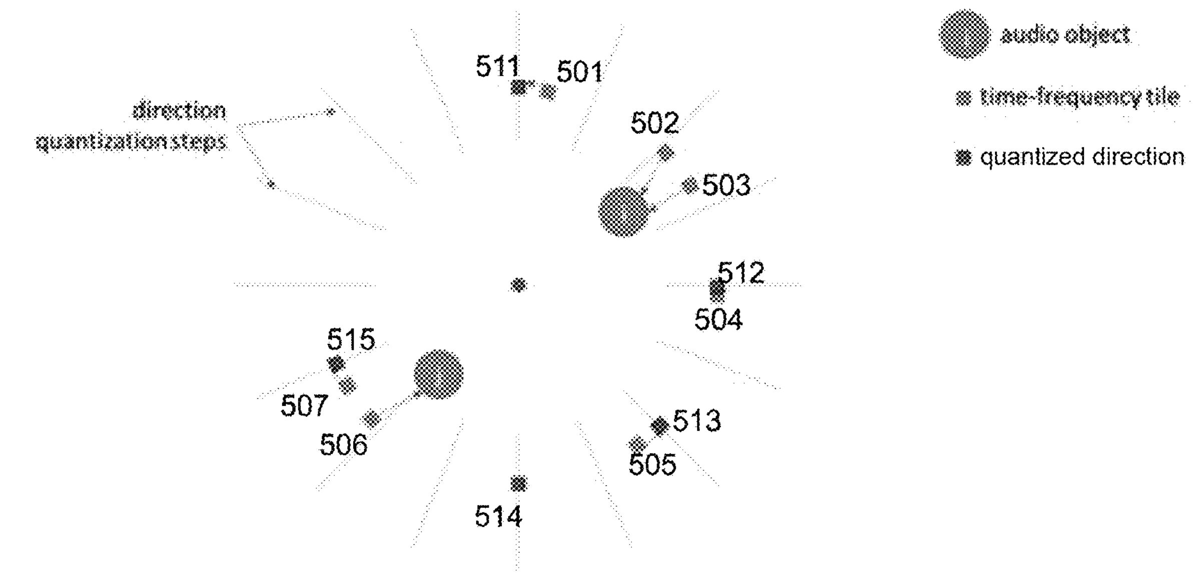
FIG. 5 shows an example of selecting the encoding of a time-frequency tile between normal encoding and audio object index according to an embodiment.

The above embodiments are illustrated by an example of FIG. 5, where an azimuth plane of a sphere divided into 16 direction quantization steps is shown. It is noted that in a real-life case also elevation values were considered, but herein only azimuth is considered for illustrative purposes.

FIG. 5 shows seven time-frequency tiles 501-507 along the circumference of the azimuth plane. There are also five quantized directions 511-515 along the circumference of the azimuth plane locating at the lines representing the direction quantization steps. FIG. 5 also shows locations of two audio objects i, j in the azimuth plane. Time-frequency tiles 501, 504, 505 and 507 are quantized to the closest quantized directions 511, 512, 513, 515, correspondingly. However, time-frequency tiles 502, 503, as well as 506, locate in directions, which are sufficiently close to the direction of the audio objects i and j, correspondingly. In other words, time-frequency tiles 502, 503, as well as 506, are considered to be masked by the audio objects i and j, correspondingly. Thus, instead of encoding a quantized direction metadata for the time-frequency tiles 502, 503, an index for the audio object i may be encoded. Similarly, for the time-frequency tile 506, an index for the audio object j may be encoded.

As mentioned above, direction for time-frequency is encoded using a variable bit rate, where 1-11 bits per time-frequency tile are used in encoding, depending on the energy-ratio. When using the index to an audio object, the number of bits required to encode the direction depends on the number of audio objects. Thus, for a single time-frequency tile, either way may be better in terms of bit rate.

According to an embodiment, an indication is encoded in the bitstream for indicating whether a time-frequency tile direction may be encoded as an index to an audio object. Since the direction can be encoded either as an index to an audio object or quantized normally, an additional bit may be added to the bitstream for each time-frequency tile to indicate which of these is being used. Due to varying circumstances, in some cases it may be beneficial to use the encoding as an index to an audio object and in some cases, it may be beneficial to use normal encoding. Thus, an additional bit may be used, for example, at frame level that indicates whether normal encoding is used or whether a time-frequency tile direction may be encoded as an index to an audio object.

Figure 6:
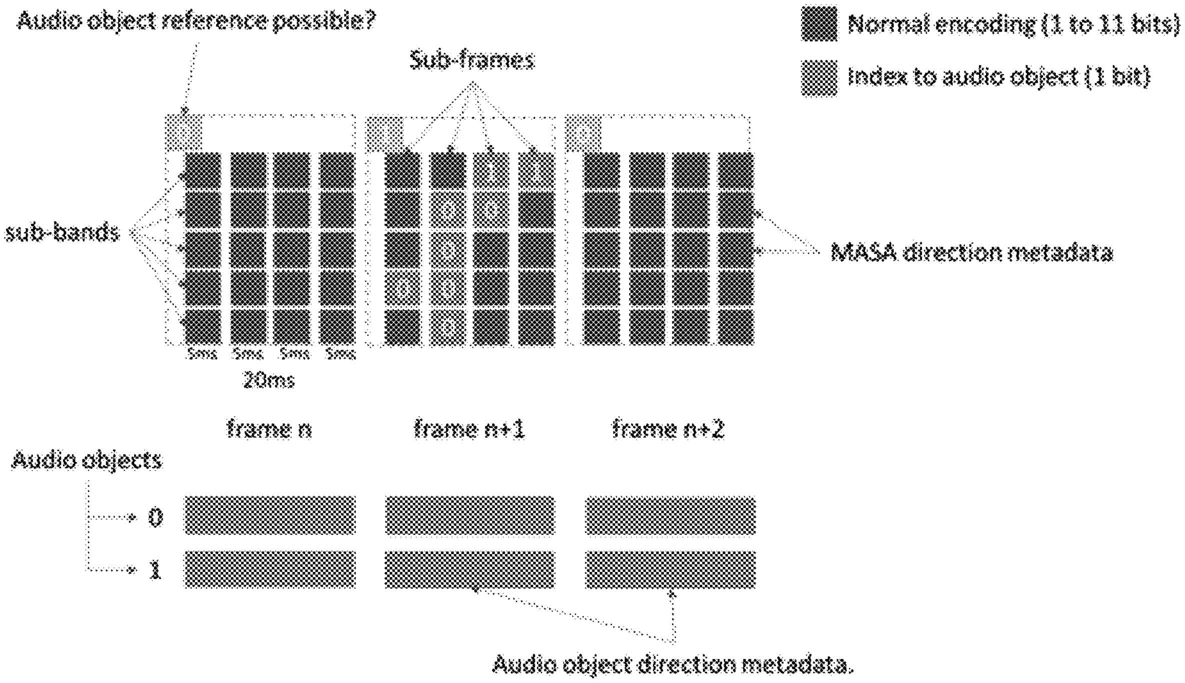
FIG. 6 shows an example of indicating the encoding of a time-frequency tile between normal encoding and audio object index according to an embodiment.

This is illustrated by an example of FIG. 6, where a sequence of audio frames n, n+1, n+2, . . . is shown. Each audio frame, having temporal length of 20 ms, is divided into four sub-frames having temporal length of 5 ms. In the frequency domain, each audio frame is further divided into a plurality of frequency sub-bands. Thus, each frame is represented by a plurality of time-frequency tiles. In this example, there are two audio objects, 0 and 1, which both have their audio object direction metadata defined for each audio frame n, n+1, n+2.

Each audio frame n, n+1, n+2 is provided with a further bit indicating whether an audio object reference is possible; i.e. it indicates whether or not a time-frequency tile direction within the frame in question may be encoded as an audio object index. In frames n and n+2, the bit is set to zero, whereas in frame n+1, the bit is set to one. Thus, in frame n+1, any of the time-frequency tiles may be encoded as an audio object index (lighter tiles) or normally (darker tiles). Herein, determining whether or not allow the audio object indexing to be used (by setting the bit to 1) is carried out in terms of improving the compression efficiency, i.e. whether it is better, in terms of reducing the bit rate of the encoded bitstream, to encode a time-frequency tile direction as an index to an audio object or according to the normal encoding scheme.

Figure 7:
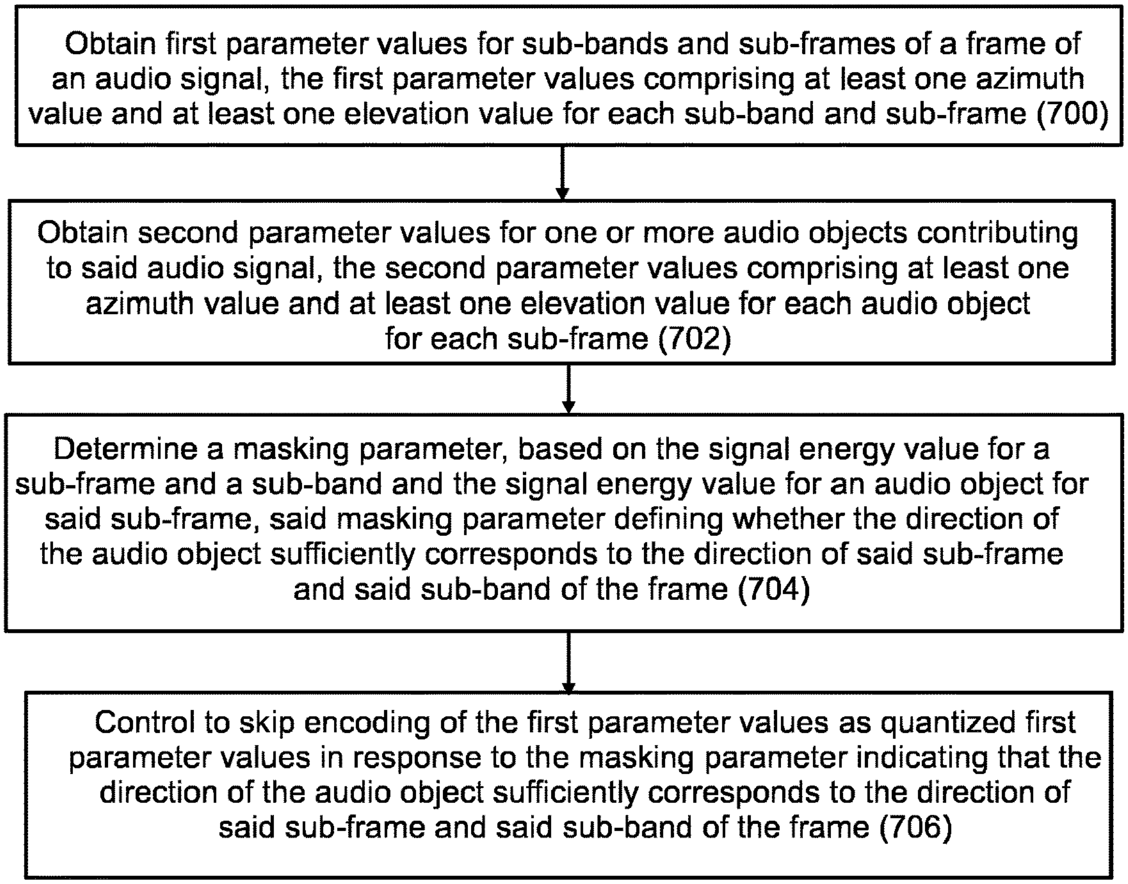
FIG. 7 show a flow chart for encoding time-frequency tiles of an audio frame according to yet another embodiment.

FIG. 7 shows a flowchart according to an embodiment, where a possible masking of a time-frequency tile by an audio object is determined based on audio signal energies of the time-frequency tile and the audio object for candidate time-frequency tile-audio object pairs. Again, the first two steps are similar to those of FIG. 3: first, the direction metadata (i.e. azimuth, elevation) for the time-frequency tile is obtained (700), and secondly, the direction metadata is obtained for all audio objects (702).

The embodiment further comprises determining a masking parameter, based on the signal energy value for a sub-frame and a sub-band and the signal energy value for an audio object for said sub-frame, said masking parameter defining whether the direction of the audio object sufficiently corresponds to the direction of said sub-frame and said sub-band of the frame (704).

Then, in addition to direction metadata, the signal energies corresponding to time-frequency tiles and audio objects are considered by calculating audio signal energies of the time-frequency tile and the audio object for candidate time-frequency tile/audio object pairs. Herein, for example the following Eq. 2 may be used:

$$M = \frac{E(s_b)}{E(s_a)r_a} W(d_{ab}), \tag{2}$$

where M is a masking parameter for a candidate pair of a time-frequency tile/an audio object, $E(s_a)$ is the signal energy corresponding to the time-frequency tile, $r_a$ is the energy-ratio of the time-frequency tile, $E(s_b)$ is the energy of the audio signal associated with the audio object (which may be band-limited to the sub-band of the time-frequency tile), dab is the great circle distance (defined in Eq. 1 above) between the time-frequency tile direction and audio object direction and W is a weighting function used for defining the candidate pairs of a time-frequency tile and an audio object, as explained below.

Then the direction encoding of the time-frequency tile is controlled according to the masking parameter, i.e. based on the signal energies and the direction metadata of a pair of a time-frequency tile and an audio object.

According to an embodiment, the encoding is controlled to skip encoding of the first parameter values as quantized first parameter values in response to the masking parameter indicating that the direction of the audio object sufficiently corresponds to the direction of said sub-frame and said sub-band of the frame (706).

Based on the masking parameter M, the encoding may be controlled as follows:

if M>1, the time-frequency tile is considered to be masked by the audio object and thus direction encoding of the time-frequency tile is skipped;

if M=<1, use normal direction encoding.

The skipping of direction encoding may be indicated by one bit.

Figure 8A:
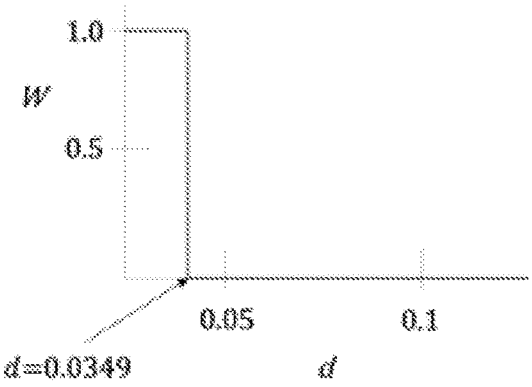
FIGS. 8*a*, 8*b* show examples of weighting functions used for defining the candidate pairs of a time-frequency tile and an audio object according to an embodiment.
Figure 8B:
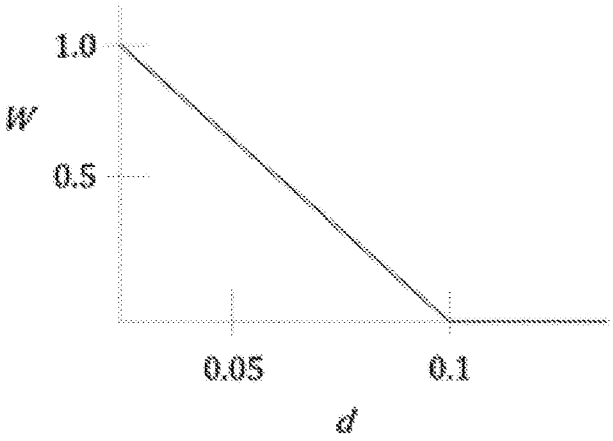

The weighting function W is used to allow masking to happen only when the audio object and time-frequency tile has a sufficiently similar direction. Depending on the case, various types of weighting functions may be used. FIGS. 8*a* and 8*b* show two example weighting functions based on the great circle distance (d) between an audio object and a time-frequency tile.

FIG. 8*a* shows a weighting function with an abrupt threshold of 0.0349, which is equivalent to 2 degrees separation in azimuth, when elevation is 0. Thus, for a pair of a time-frequency tile and an audio object having separation more than 2 degrees in azimuth, Eq. 2 obtains a value of zero, and the normal direction encoding is applied to the time-frequency tile.

FIG. 8*b* shows a weighting function, which linearly reduces from 1 to 0 at the value of d=0.1, which is equivalent to about 6 degrees separation in azimuth, when elevation is 0. Thus, for a pair of a time-frequency tile and an audio object having separation more than 6 degrees in azimuth, Eq. 2 obtains a value of zero, and the normal direction encoding is applied to the time-frequency tile. On the other hand, if the separation is e.g. 4 degrees in azimuth, then depending on the signal energies and the energy-ratio of the time-frequency tile, it is possible that direction encoding of the time-frequency tile is skipped.

According to an embodiment, an indication is encoded in the bitstream for indicating whether the direction encoding of a time-frequency tile may be skipped. Due to varying circumstances, in some cases it may be beneficial to skip the direction encoding of a time-frequency tile and in some cases, it may be beneficial to use normal encoding. Thus, an additional bit may be used, for example, at frame level that indicates whether normal encoding is used or whether the direction encoding of a time-frequency tile is allowed to be skipped.

Figure 9:
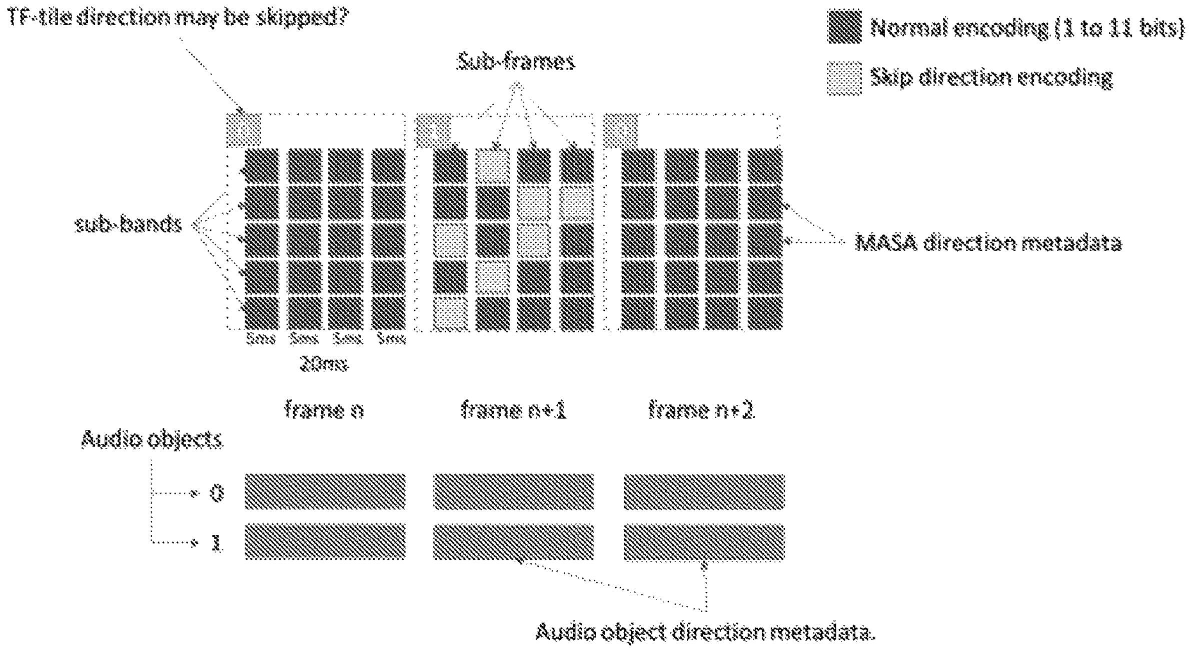
FIG. 9 shows an example of indicating the encoding of a time-frequency tile between normal encoding and skipping the encoding according to an embodiment.

This is illustrated by an example of FIG. 9, where, similarly to FIG. 6, a sequence of audio frames n, n+1, n+2, . . . is shown. Each audio frame, having temporal length of 20 ms, is divided into four sub-frames having temporal length of 5 ms. In the frequency domain, each audio frame is further divided into a plurality of frequency sub-bands, resulting in a plurality of time-frequency tiles for each frame. Again, there are two audio objects, 0 and 1, which both have their audio object direction metadata defined for each audio frame n, n+1, n+2.

Each audio frame n, n+1, n+2 is provided with a further bit indicating whether the direction encoding of time-frequency tiles in the frame is allowed to be skipped. In frames n and n+2, the bit is set to zero, whereas in frame n+1, the bit is set to one. Thus, in frame n+1, the direction encoding of any of the time-frequency tiles may be skipped (lighter tiles) or the direction encoding may be carried out normally (darker tiles). Herein, determining whether or not allow the direction encoding of any of the time-frequency tiles to be skipped (by setting the bit to 1) is carried out in terms of improving the compression efficiency, i.e. whether it is better, in terms of reducing the bit rate of the encoded bitstream, to skip the direction encoding of any of the time-frequency tiles in a frame or to apply the normal encoding scheme.

According to an embodiment, the bitstream may comprise indications for both indicating whether a time-frequency tile direction may be encoded as an index to an audio object and indicating whether the direction encoding of a time-frequency tile may be skipped. Thus, the two embodiments described above may be combined to be applied to different frames of the audio frame sequence.

Figure 10:
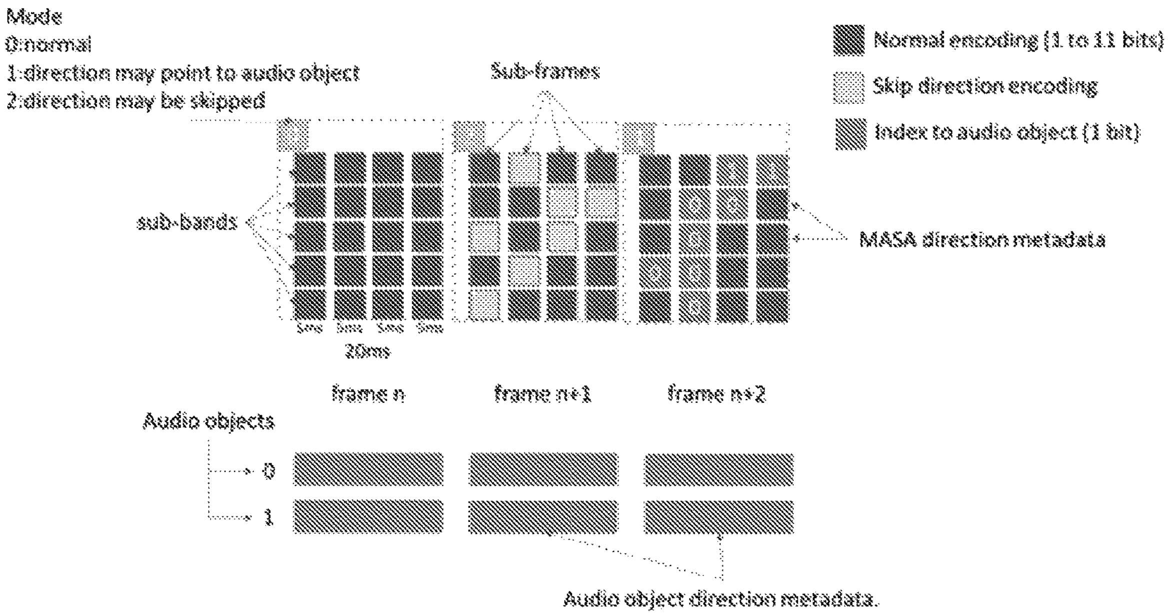
FIG. 10 shows an example of indicating the encoding of a time-frequency tile between normal encoding, audio object index and skipping the encoding according to an embodiment.

FIG. 10 shows an example, similar to the examples in FIGS. 6 and 9, where a frame-level indication is included in the bitstream for indicating whether the direction encoding is done in the normal way, audio object indices may be used or direction metadata may be skipped. Again, during the encoding, the mode is selected based on which of the modes is most bit efficient.

Herein, the indication of the modes may be carried out by two bits included in the bitstream at the frame-level. Alternatively, only one bit may be used such that the absence of the bit indicates one mode, e.g. the direction encoding to be carried out in the normal way, whereas the two other options are indicated by the value of the bit included in the bitstream.

In the above embodiments, the usage of the threshold value T or the weighting function W ensures that the time-frequency tile direction is sufficiently close to the direction of an audio object. However, the usage of the mere directional difference in controlling the encoding may not always lead to an optimal result in compression efficiency in terms of bit rate.

Figure 11:
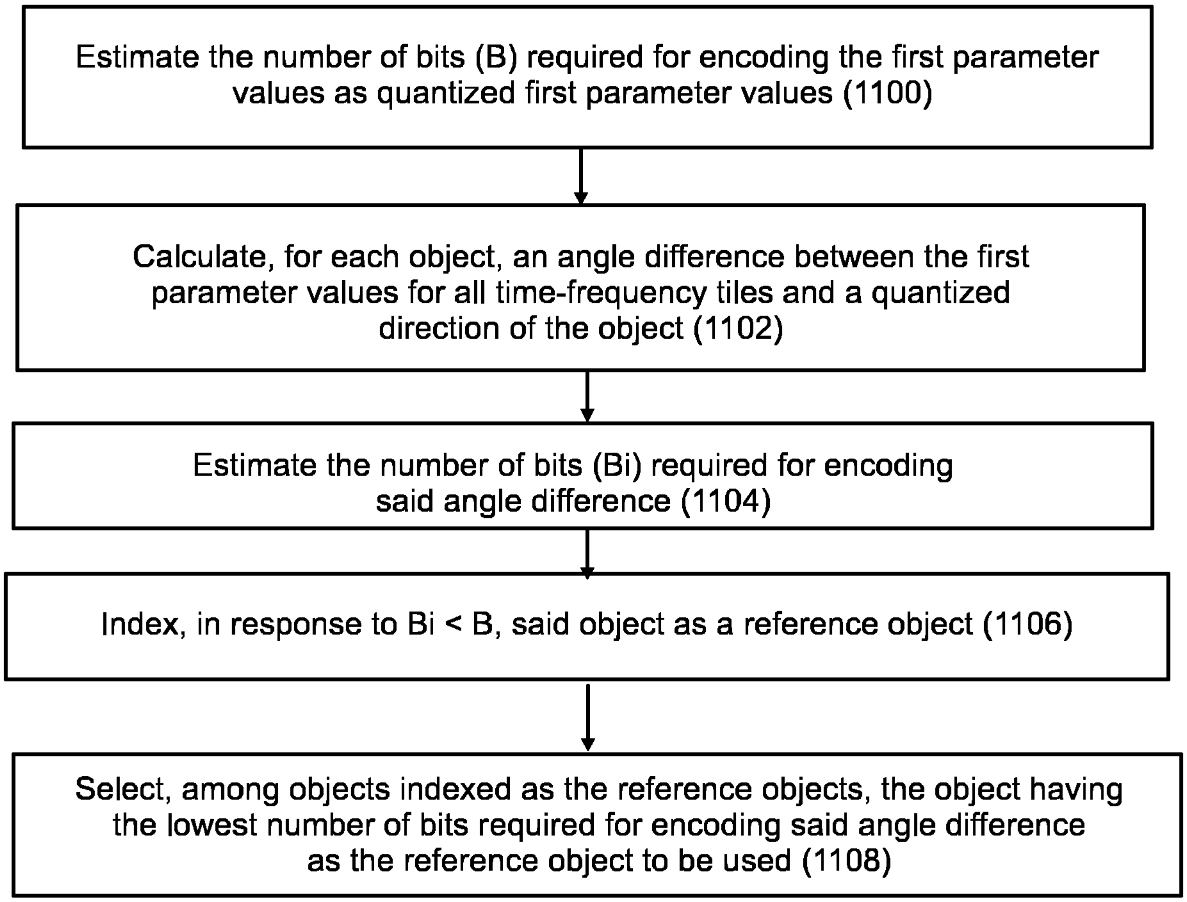
FIG. 11 show a flow chart for encoding time-frequency tiles of an audio frame according to yet another embodiment.

FIG. 11 shown a flow chart for an embodiment, where the second parameter values of at least one audio object are used as a reference when encoding the first parameter values as quantized first parameter values. The starting point for the embodiment is that the first two steps of any of the flow charts of FIGS. 3, 4 and 7 has been completed, i.e. the direction metadata for the time-frequency tile has been obtained, and the direction metadata is obtained for all audio objects.

The embodiment comprises estimating (1100) the number of bits required for encoding the first parameter values as quantized first parameter values; calculating (1102), for each object, an angle difference between the first parameter values for all time-frequency tiles and a quantized direction of the object; estimating (1104) the number of bits required for encoding said angle difference; indexing (1106), in response to the number of bits required for encoding said angle difference is smaller than the number of bits required for encoding the first parameter values as quantized first parameter values, said object as a reference object, and selecting (1108), among objects indexed as the reference objects, the object having the lowest number of bits required for encoding said angle difference as the reference object to be used.

Thus, instead of applying the directional difference between the time-frequency tile direction and the direction of an audio object as the parameter for controlling the encoding, this embodiment rather uses the determined savings in the encoding bit rate as the criteria for controlling the encoding. Hence, it is enabled to select an audio object having a wider directional difference between the time-frequency tile direction and the direction of an audio object, compared e.g. to the limitations set by the threshold value T or the weighting function W, as a trade-off for better compression efficiency.

It is noted that in estimating the number of bits required for encoding the angle difference between the first parameter values for all time-frequency tiles and a quantized direction of the object, the encoding refers to the "normal encoding" as described above, i.e. encoding the first parameter values as quantized first parameter values.

According to an embodiment, the method further comprises signalling, if a reference object is used for encoding, and if affirmative, including an indication about the index of reference object in or along the bitstream to be encoded.

Thus, similarly to embodiments above, an additional bit may be used, for example, at frame level that indicates whether a reference object is used for encoding. For indicating the index of reference object, a required number of further bits may be included at frame level.

According to an embodiment, the signalling of using the reference object and the indicating of the index of reference object is carried out for each time-frequency tile. Hence, the reference object may be considered for each time-frequency tile separately. If applied, the reference object signalling may be sent for each time-frequency tile, followed by the index of the reference object of that time-frequency tile.

Consequently, the embodiments as described herein enable to reduce the bit rate of the encoded audio bitstream. The embodiments also enable to selectively decide most bit-efficient way of encoding a time-frequency tile.

Figure 12:
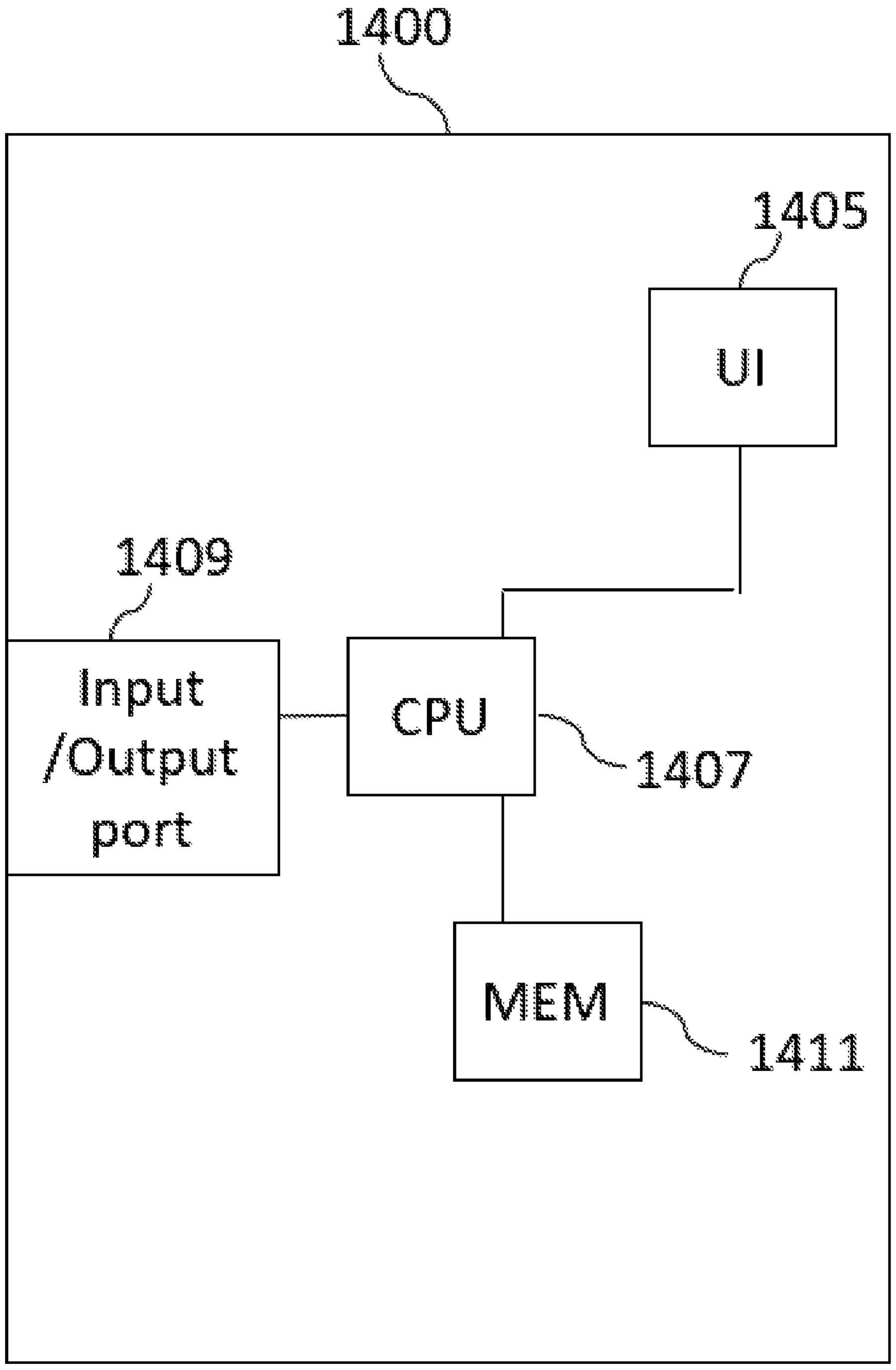
FIG. 12 shows an example electronic device which may be used for implementing the embodiments.

FIG. 12 shows an example electronic device which may be used as the analysis (encoding) or synthesis (decoding) device. The device may be any suitable electronics device or apparatus. For example, in some embodiments the device 1400 is a mobile device, user equipment, tablet computer, computer, audio playback apparatus, etc.

In some embodiments the device 1400 comprises at least one processor or central processing unit 1407. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore, in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example, the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating with the position determiner as described herein.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1409 may be configured to receive the signals and in some embodiments determine the parameters as described herein by using the processor 1407 executing suitable code. Furthermore, the device may generate a suitable downmix signal and parameter output to be transmitted to the synthesis device.

In some embodiments the device 1400 may be employed as at least part of the synthesis device. As such the input/output port 1409 may be configured to receive the downmix signals and in some embodiments the parameters determined at the capture device or processing device as described herein and generate a suitable audio signal format output by using the processor 1407 executing suitable code. The input/output port 1409 may be coupled to any suitable audio output for example to a multichannel speaker system and/or headphones or similar.

An apparatus according to an aspect of the invention is arranged to implement the method as described above, and possibly one or more of the embodiments related thereto. Thus, the apparatus, such as the apparatus depicted in FIG. 11, comprises means for obtaining a first audio direction parameter value for each sub-band of a sub-frame of a frame of an audio signal; means for obtaining a second audio direction parameter value for the sub-frame of the frame of the audio signal for one or more audio objects associated with said audio signal; and means for determining a bit-efficient encoding for each first audio direction parameter value of the sub-frame based on a similarity between the first audio direction parameter value for each sub-band and the second audio direction parameter value for the one or more audio objects.

An apparatus according to a further aspect comprises at least one processor and at least one memory, said at least one memory stored with computer program code thereon, the at least one memory and the computer program code configured to, with the at least one processor, cause the apparatus at least to perform: obtain a first audio direction parameter value for each sub-band of a sub-frame of a frame of an audio signal; obtain a second audio direction parameter value for the sub-frame of the frame of the audio signal for one or more audio objects associated with said audio signal; and determine a bit-efficient encoding for each first audio direction parameter value of the sub-frame based on a similarity between the first audio direction parameter value for each sub-band and the second audio direction parameter value for the one or more audio objects.

In the above, some embodiments have been described with reference to an encoder or an encoding method, it needs to be understood that the resulting bitstream and the decoder or the decoding method may have corresponding elements in them. Likewise, where the example embodiments have been described with reference to a decoder, it needs to be understood that the encoder may have structure and/or computer program for generating the bitstream to be decoded by the decoder.

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended examples. However, all such and similar modifications of the teachings of this invention will still fall within the scope of this invention.

The invention claimed is:

1. An apparatus comprising at least one processor and at least one memory including computer program code, the at least one memory and the computer program code configured to, with the at least one processor, cause the apparatus to:

obtain a first audio direction parameter value, for a sub-band of a sub-frame of a frame of an audio signal;

obtain a second audio direction parameter value, wherein the second audio direction parameter value is an audio direction parameter value of an audio object associated with the frame or the subframe of the audio signal; and determine a bit-efficient encoding for the first audio direction parameter value of the sub-frame based on a similarity-directional difference between the first audio direction parameter value and the second audio direction parameter value.

2. The apparatus according to claim 1, wherein said first and second audio direction parameters are each defined as a point on a surface of a sphere.

3. The apparatus according to claim 1, wherein the first audio direction parameter value comprises at least one azimuth value and at least one elevation value for the sub-band of the sub-frame of the frame of the audio signal and the second audio direction parameter values comprises at least one azimuth value and at least one elevation value of the audio object associated with the frame or subframe of the audio signal.

4. The apparatus according to claim 1, wherein the bit-efficient encoding for the first audio direction parameter values comprises:

encoding an index of the audio object as the first audio direction parameter value in response to the directional difference of the second audio direction parameter value and the first audio direction parameter value being below a predetermined threshold; or encoding the first audio direction parameter value as a quantized first audio direction parameter value in response to the directional difference of the second audio direction parameter value and the first audio direction parameter value being above said predetermined threshold.

5. The apparatus according to claim 1, wherein the apparatus is further caused to:

encode an indication in or along a bitstream for indicating whether an index of an audio object is allowed to be encoded as the first audio direction parameter value.

6. The apparatus according to claim 1, wherein the first audio direction parameter value further comprises a signal energy value for the sub-band of the sub-frame of the frame of the audio signal and the second audio direction parameter value further comprises a signal energy value of the audio object associated with the frame or sub-frame of the audio signal; and the apparatus is further caused to:

determine a masking parameter, based on the signal energy value for a sub-frame and a sub-band of the sub-frame of the frame of the audio signal and the signal energy value of the audio object associated with the frame or sub frame of the audio signal, said masking parameter defining whether the second audio direction parameter value sufficiently corresponds to the first audio direction parameter value.

7. The apparatus according to claim 6, further caused to:

skip encoding of the first audio direction parameter value as a quantized first audio direction parameter value in response to the masking parameter indicating that the second audio direction parameter value sufficiently corresponds to the first audio direction parameter value.

8. The apparatus according to claim 6, further caused to:

adjust the masking parameter by a weighting function, said weighting function adjusting an angle required for sufficient correspondence of the second audio direction parameter value and the first audio direction parameter value.

9. The apparatus according to claim 6, further caused to:

encode an indication in or along a bitstream for indicating whether encoding of the first audio direction parameter value as the quantized first audio direction parameter value is allowed to be skipped.

10. The apparatus according to claim 1, wherein the apparatus caused to determine the bit-efficient encoding for the first audio direction parameter value is caused to use the second audio direction parameter value as a reference when encoding the first audio direction parameter value as a quantized first audio direction parameter value.

11. A method comprising:

obtaining a first audio direction parameter value, for a sub-band of a sub-frame of a frame of an audio signal;

obtaining a second audio direction parameter value, wherein the second audio direction parameter value is an audio direction parameter value of an audio object associated with the frame or the subframe of the audio signal; and determining a bit-efficient encoding for the first audio direction parameter value of the sub-frame based on a directional difference between the first audio direction parameter value and the second audio direction parameter value.

12. The method according to claim 11, wherein said first and second audio direction parameters are each defined as a point on a surface of a sphere.

13. The method according to claim 11, wherein the first audio direction parameter value comprises at least one azimuth value and at least one elevation value for the sub-band of the sub-frame of the frame of the audio signal and the second audio direction parameter values comprises at least one azimuth value and at least one elevation value of the audio object associated with the frame or subframe of the audio signal.

14. The method according to claim 11, wherein the bit-efficient encoding for the first audio direction parameter values comprises:

encoding an index of the audio object as the first audio direction parameter value in response to the directional difference of the second audio direction parameter value and the first audio direction parameter value being below a predetermined threshold; or encoding the first audio direction parameter value as a quantized first audio direction parameter value in response to the directional difference of the second audio direction parameter value and the first audio direction parameter value being above said predetermined threshold.

15. The method according to claim 11, further comprising:

encoding an indication in or along a bitstream for indicating whether an index of an audio object is allowed to be encoded as the first audio direction parameter value.

16. The method according to claim 11, wherein the first audio direction parameter value further comprises a signal energy value for the sub-band of the sub-frame of the frame of the audio signal and the second audio direction parameter value further comprises a signal energy value of the audio object associated with the frame or sub-frame of the audio signal; and the method further comprises:

determining a masking parameter, based on the signal energy value for a sub-frame and a sub-band of the sub-frame of the frame of the audio signal and the signal energy value of the audio object associated with the frame or sub frame of the audio signal, said masking parameter defining whether the second audio direction parameter value sufficiently corresponds to the first audio direction parameter value.

17. An apparatus comprising at least one processor and at least one memory including computer program code, the at least one memory and the computer program code configured to, with the at least one processor, cause the apparatus to:

obtain a first audio direction parameter value, for a sub-band of a sub-frame of a frame of an audio signal;

obtain a second audio direction parameter value for the sub-frame of the frame of the audio signal for an audio object associated with said audio signal;

determine a bit-efficient encoding for the first audio direction parameter value of the sub-frame based on a directional difference between the first audio direction parameter value and the second audio direction parameter value, wherein the first audio direction parameter value further comprises a signal energy value for the sub-band of the sub-frame of the frame of the audio signal and the second audio direction parameter value further comprises a signal energy value of the audio object; and determine a masking parameter, based on the signal energy value for a sub-frame and a sub-band of the sub-frame of the frame of the audio signal and the signal energy value of the audio object, said masking parameter defining whether the second audio direction parameter value sufficiently corresponds to the first audio direction parameter value.

18. The apparatus according to claim 17, wherein the at least one memory and the computer program code are configured to, with the at least one processor, further cause the apparatus to:

skip encoding of the first audio direction parameter values as a quantized first audio direction parameter values in response to the masking parameter indicating that the second audio direction parameter value sufficiently corresponds to the first audio direction parameter value.

19. The apparatus according to claim 17, wherein the at least one memory and the computer program code are configured to, with the at least one processor, further cause the apparatus to:

adjust the masking parameter by a weighting function, said weighting function adjusting an angle required for sufficient correspondence of the second audio direction parameter value and the first audio direction parameter value.

20. The apparatus according to claim 17, wherein the at least one memory and the computer program code are configured to, with the at least one processor, further cause the apparatus to:

encode an indication in or along a bitstream for indicating whether encoding of the first audio direction parameter value as the quantized first audio direction parameter value is allowed to be skipped.

* * * * *